June 7, 1960 R. W. HALBERG ET AL 2,939,540
BEARING POSITIONING MECHANISM FOR PROPELLER SHAFT
Filed Dec. 10, 1956
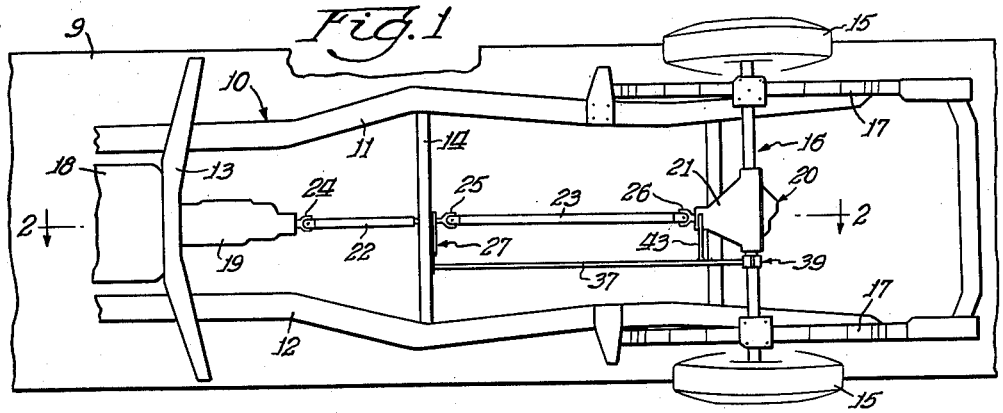
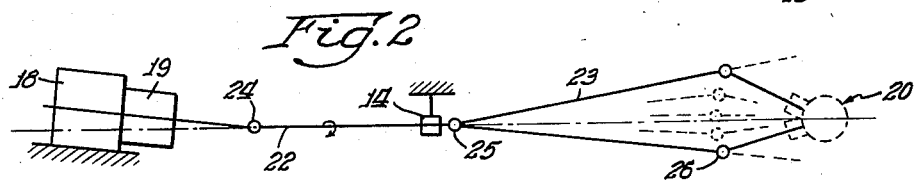
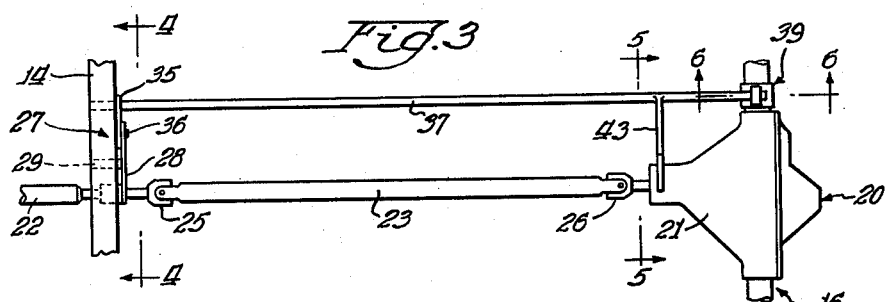
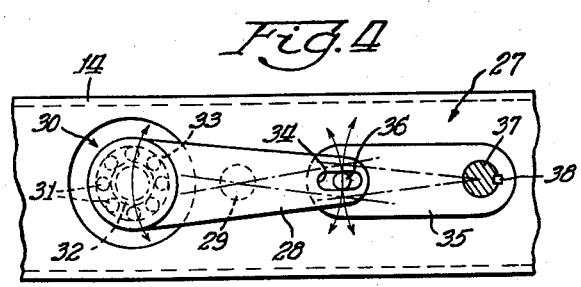
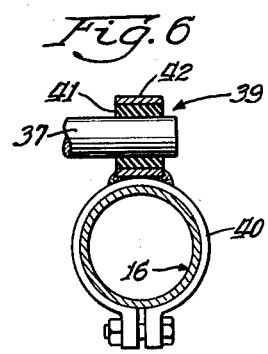
Inventors:
Robert W. Halberg
and Roger S. Hutton
By: Keith J. Blews Atty United States Patent Office 2,939,540
Patented June 7, 1960

2,939,540

BEARING POSITIONING MECHANISM FOR PROPELLER SHAFT

Robert W. Halberg, Des Plaines, and Roger S. Hutton, Wheaton, Ill., assignors to Borg-Warner Corporation, Chicago, Ill., a corporation of Illinois Filed Dec. 10, 1956, Ser. No. 627,356

8 Claims. (Cl. 180—70)

Our invention relates to bearings for the drive or propeller shafts of automotive vehicles, and more particularly to mechanical means for moving the bearing under the influence of torque transmitted through the drive shaft.

In an automotive vehicle having a drive shaft assembly with universal joints at each end and comprising a central universal joint connecting two drive shaft sections, with a bearing mounting one of the shaft sections with respect to the body of the vehicle adjacent the center universal joint, difficulties are encountered in keeping the drive shaft assembly running smoothly when changes in angles occur at the universal joints, such as when high torque is transmitted through the drive shaft assembly causing the rear axle housing to turn so as to move the protuberant forward portion of the differential upwardly and thus wind up on the rear vehicle springs. Such a rotation of the rear axle housing occurs also, but in the reverse direction when the brakes are applied on the vehicle or the vehicle is driven in reverse, resulting in further angular deviations in the above-mentioned universal joints. It should be noted here that secondary couple bending moments exist in the drive shaft assembly when in operation, which may cause vibration or roughness with angle changes and torque changes at the universal joints under the conditions mentioned; this is so because these secodary couple bending moments produce forces acting on the bearing. These secondary couple bending moments are those in the propeller shaft assembly due to the angles made at the universal joints, and these introduce forces comprising static and dynamic or vibratory components, and the vibratory components are objectionable particularly at the center bearing. These couples are developed essentially because of the shapes and motions of the parts of the universal joints when operating at an angle. These secondary couple bending moments at each yoke are at a maximum when the yokes of the universal joints are at right angles to the plane containing the two shaft sections. Under the different conditions mentioned above, the shaft sections remain substantially in line looking from either the top or bottom of the vehicle, and the plane of the shaft sections just mentioned thus is a vertical plane.

The vector sum of the static components existing at the center bearing due to the secondary couple bending moments may be called a resultant static force and is hereinafter so referred to, and this resultant static force acts substantially horizontally and in a direction, right or left, dependent on the torque and joint angles. The vector sum of the dynamic components existing at the bearing due to the secondary couple bending moments may be called a resultant dynamic vibratory force and is hereinafter so referred to.

It is an object of our invention to provide an improved bearing support for the above mentioned bearing for a central portion of the drive shaft assembly, which not only will take the reaction of the drive shaft assembly from these resultant static and dynamic or vibratory forces with respect to the frame of the vehicle, but will also automatically position the bearing so that the resultant dynamic or vibratory forces are minimized for the various conditions of operation of the vehicle.

It is a further object to provide a mechanical means associated with the rear axle housing in a manner whereby the wind up of the rear axle resulting from torque transmitted through the drive shaft assembly will move the bearing to a position compatible with the varying operating conditions of the drive shaft assembly so as to minimize the resultant dynamic or vibratory forces and promote smooth operation.

The invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

Fig. 1 is a bottom view of the major portion of a vehicle chassis showing the drive shaft assembly connected to the transmission at one end and to the differential at the other end and also showing, generally, a bearing positioning mechanism embodying the principles of the invention;

Fig. 2 is a side diagrammatic view of the drive shaft assembly showing the extremes of movement of parts thereof under the influence of torque and reverse torque taken on line 2—2 of Fig. 1;

Fig. 3 is a fragmentary top view on an enlarged scale of bearing positioning mechanism;

Fig. 4 is a cross sectional elevational view on a further enlarged scale taken on line 4—4 of Fig. 3; and Fig. 5 is a cross sectional elevational view on an enlarged scale taken on line 5—5 of Fig. 3; and Fig. 6 is a sectional view on an enlarged scale taken on line 6—6 of Fig. 3.

Like characters of reference designate like parts in the several views.

Referring now to the drawings, there is illustrated a conventional automobile with a body 9 mounted on a frame 10. The frame 10 comprises two side frame members 11 and 12. The frame members 11 and 12 are connected together by a plurality of cross frame members including the cross frame members 13 and 14. The rear axle wheels 15 of the vehicle mounted with respect to the rear axle housing assembly 16 are supported with respect to the frame 10 by means of rear springs 17, fixed with respect to the side frame members 11 and 12.

The usual vehicle engine 18 is mounted on the front end of the vehicle frame 10, and has a conventional transmission 19 connected thereto. The rear axle housing assembly 16 contains the usual differential 20 and comprises a differential housing 21. Drive shaft sections 22 and 23 are utilized for providing a driving connection between the transmission 19 and the differential 20. Universal joints 24, 25 and 26 are provided, respectively, between the transmission 19 and the drive shaft section 22, between the drive shaft sections 22 and 23, and between the section 23 and the differential 20.

The drive shaft section 22 is swingably mounted with respect to the cross member 14 by means of a bearing and positioning mechanism 27. The bearing and positioning mechanism 27 comprises a lever 28 which is swingably mounted by a pivot 29 to the cross frame member 14, as shown in Fig. 4. The lever 28 carries a bearing 30 which comprises a plurality of balls 31 disposed between an inner race 32 and an outer race 33. We wish to point out, however, that our invention is not limited to any particular type of bearing. The drive shaft section 22 extends through the inner race 32 and the outer race 33 is disposed within and carried by the lever 28.

The lever 28 has a slot 34 therein by means of which it is pivotally connected to an arm 35 by means of a stud 36 carried by the arm 35 at one end. The arm 35 at its other end, is keyed to a shaft 37 by means of a key 38. The shaft 37 is rotatively pivoted in the cross frame member 14 and extends rearwardly, generally paralleling the drive shaft assembly. The shaft 37 is pivoted and held at its rear end with respect to the rear axle housing assembly 16 by means of a flexible connection 39. The flexible connection 39 comprises a band 40 clamped around the housing assembly 16 and a grommet 41 of rubber-like material including the shaft 37 and disposed in a casing portion 42 which is part of the band 40. A yoke 43 is fixed to the shaft 37 and embraces the front end of the differential housing 21 as shown in the drawing.

Specifically, in operation, when the vehicle is initially driven forwardly, the torque through the drive shaft assembly causes the front end of the differential housing 21 to rotate upwardly to a degree generally in proportion to the amount of torque transmitted. This upward rotation of the differential housing 21 is impressed on the frame 10 through the rear springs 17, the springs yielding so as to allow this movement of the differential housing 21. This rotation of the differential housing 21 against the flexing action of the springs 17 is due to the reaction that frame 10 takes due to the driving effect of the driving road wheels 15. The upward movement of the housing 21 changes the angles of the universal joints 24, 25 and 26, and more particularly between the drive shaft sections roughly, in proportion to the amount of the wind up. It should be pointed out, however, that other factors will cause a change in the angles of the universal joints 24, 25 and 26 such as, variation in the load carried by the vehicle and the deflection of the springs when the vehicle hits uneven spots in the road during its operation. It should be further pointed out that vehicles of different makes have different universal joint angles in the drive shaft assembly under static conditions and other differences in connection with the arrangement of the various parts which constitute the completed vehicle as a product. These angle changes of the universal joints tend to cause roughness in the performance of the drive shaft assembly. It is the purpose of this bearing support and positioning mechanism 27 when installed in the various types of vehicles employing the three universal joint type of drive shaft assemblies, to function in such manner so as to automatically move the bearing to a position most compatible for smooth operation when torque and angle changes in the universal joints occur.

The housing 21 acts on the shaft 37, when so rotated upwardly, by virtue of the yoke 43, which is fixed at one end to the shaft 37 and embraces the front end of the housing 21, causing the shaft 37 to rotate in a clockwise direction as seen in Fig. 4. This clockwise rotation of the shaft 37 swings arm 35, which is keyed to the shaft 37, upwardly as seen in Fig. 4. This upward swing of the arm, co-acting with one end of the lever 28 by means of the stud 36, causes the other end of the lever 28 and the bearing 30 to move downwardly since the lever 28 swings about the pivot 29.

Conversely, if the vehicle brakes are applied when the vehicle is driven forwardly, or the vehicle is driven in reverse, the front end of the differential housing 21 rotates downwardly causing a reversal of the chain of mechanical movements outlined above. Specifically, in this case, the front end of the differential housing 21 moves downwardly, the shaft 37 and its arm 35 rotate counterclockwise as seen in Fig. 4, and the bearing 30 is moved upwardly due to pivotal movement of the lever 28. Hence, it can be seen that whenever the front end of the housing 21 moves either upwardly or downwardly under the influence of torque, there is a movement of the bearing 30 in the opposite direction, thus locating it in a new position.

We have found that by so lowering the bearing 30 due to the movement of the rear axle housing assembly 16 due to driving torque from the engine 18, results in very smooth operation of the drive shaft assembly comprising the three universal joints 24, 25 and 26 and the two drive shaft sections 22 and 23. Without such a lowering of the bearing 30 when the universal joint angles are changed due to upward movement of the front end of the differential housing 21, strong resultant dynamic or vibratory forces exist at the bearing. This movement of the bearing minimizes such vibratory forces. Conversely, a downward movement of the front end of the differential housing 21 causes an upward movement of the bearing 30 under coasting conditions of the vehicle, for example, and the resultant dynamic or vibratory forces at the bearing are minimized under these conditions also.

We wish it to be understood that our invention is not to be limited to the specific constructions and arrangements shown and described, except only insofar as the appended claims may be so limited, as it will be understood to those skilled in the art that changes may be made without departing from the principles of the invention.

We claim:

1. In combination, a drive element, a driven element rotatably carried by a housing, a drive shaft assembly connected between said two elements and comprising first and second drive shaft sections, a universal joint between said drive element and said first drive shaft section, a universal joint between said two sections, a universal joint between said second section and said driven element, a bearing carried by a lever for supporting one of said drive shaft sections, said bearing having vibratory forces on it when there is angularity between said drive shaft sections and one of said elements is effective to drive the other of said elements through said assembly, and a shaft co-acting with said lever and said housing and movable in response to the torque transmitted through said drive shaft assembly for moving said bearing upwardly or downwardly, depending on the direction of said torque so as to reduce said vibratory forces on said bearing.

2. In combination, a drive element, a driven element rotatably carried by a housing, a drive shaft assembly connected between said two elements and comprising first and second drive shaft sections, a universal joint between said drive element and said first drive shaft section, a universal joint between said two sections, a universal joint between said second section and said driven element, a bearing carried by a lever for supporting one of said drive shaft sections, said bearing having vibratory forces on it when there is angularity between said drive shaft sections and the drive element is effective to drive the driven element through said assembly, and a shaft co-acting with said lever and said housing and movable in response to the torque transmitted through the said drive shaft assembly for moving the said bearing downwardly as the torque increases from the drive element to the driven element.

3. In combination, a drive element and a driven element, a rear axle housing for vehicle driving wheels, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having vibratory forces on it when there is angularity between said drive shaft sections and one of said elements is effective to drive the other of said elements through said assembly causing rotative movement of the said rear axle housing, and means variable with the torque transmitted through said drive shaft assembly responsive to the rotation of the rear axle housing for moving said bearing upwardly or downwardly, depending on which of said elements is driven so as to reduce said vibratory forces on said bearing.

4. In combination, a drive element and a driven element, a rear axle housing for vehicle driving wheels, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having vibratory forces on it when there is angularity between said drive shaft sections and one of said elements is effective to drive the other of said elements through said assembly causing rotative movement of the said rear axle housing, and means variable with the torque transmitted through said drive shaft assembly responsive to the rotation of the rear axle housing for moving said bearing downwardly as the rear axle housing rotates under the influence of increased torque.

5. In an automotive vehicle having a body, a rear axle housing, a transmission, a drive shaft assembly comprising two drive shaft sections connected together by means of a universal joint and mounted at the other two ends to the transmission and differential, respectively, by means of universal joints, the combination of a bearing mounted on one of said drive shaft sections, a lever carrying said bearing at one end and pivotally mounted at its medial extent with respect to said body, a shaft rotatably pivoted with respect to said body and extending rearwardly, generally paralleling the said drive shaft assembly and yieldably attached to the said rear axle assembly, said shaft having affixed thereto at its pivoted end an arm having a slot therein by means of which it is pivotally attached to other end of the said lever, said shaft also having affixed thereto at its other end a yoke extending in the direction of the front end of said rear axle housing and rotatively associated with the front end of the said rear axle housing.

6. In combination, a vehicle body, a rear axle housing for vehicle driving wheels, springs mounted between said rear axle housing and said body, a drive element, a driven element mounted in said axle housing, a drive shaft assembly connected between said two elements and comprising first and second drive shaft sections, a universal joint between said drive element and first drive shaft section, a universal joint between said two sections, a universal joint between said second section and said driven element, a bearing positioned adjacent said second-named universal joint for supporting one of said drive shaft sections, said bearing having vibratory forces on it when there is substantial angularity in said universal joints and said drive element is effective to drive said driven element through said assembly causing said rear axle housing to wind up on said springs, a shaft rotatable with the rotation of said rear axle housing, and a lever mechanism interconnecting said shaft and said bearing responsive to the wind up said housing for causing downward movement of said bearing so as to reduce the said vibratory forces on said bearing.

7. In combination, a vehicle body, a rear axle housing for vehicle driving wheels and having a forwardly extending differential housing, springs mounted between said rear axle housing and said body, a drive element, a driven element mounted in said axle housing, a drive shaft assembly connected between said two elements and comprising first and second drive shaft sections, a universal joint between said drive element and first drive shaft section, a universal joint between said two sections, a universal joint between said second section and said driven element, a bearing positioned adjacent said second-named universal joint for supporting one of said drive shaft sections, said bearing having vibratory forces on it when there is angularity in said universal joints and said drive element is effective to drive said driven element through said assembly causing said rear axle housing to wind up on said springs with said differential housing moving upwardly, a shaft rotatably and yieldably carried on one end by said rear axle housing and rotatably carried on its other end with respect to said body, a yoke fixed to said shaft on one end thereof and embracing said forwardly extending differential housing, a lever fixed to the other end of said shaft, and a second lever having a pin and slot connection at one end with said first-named lever and carrying said bearing at its other end and pivoted with respect to said body midway between its said ends, whereby the interconnecting of said shaft and said levers is responsive to said wind up of said housing for causing downward movement of said bearing so as to reduce said vibratory forces on said bearing.

8. In combination, a vehicle body, a rear axle housing for vehicle driving wheels, springs mounted between said rear axle housing and said body, a drive element, a driven element mounted in said axle housing, a drive shaft assembly connecting said drive element and said driven element and having at least three universal joints, a bearing carried by a lever supporting said drive shaft assembly between said drive and driven elements, said rear axle housing winding upwardly on said springs when torque is transmitted from said drive element to said driven element through said drive shaft assembly, and a shaft co-acting with said lever and housing for causing downward movement of said bearing with upward movement of said rear axle housing and to a degree depending on the magnitude of said torque for reducing vibratory forces on said bearing.

References Cited in the file of this patent
UNITED STATES PATENTS

| | | |
|---|---|---|
| 1,324,379 | Bicknell et al. | Dec. 9, 1919 |
| 1,388,389 | Tamura et al. | Aug. 23, 1921 |
| 2,560,759 | Evernden et al. | July 17, 1951 |